United States Patent
Alonso Ramila et al.

(10) Patent No.: US 10,000,342 B2
(45) Date of Patent: Jun. 19, 2018

(54) CONVEYING DEVICE FOR CONVEYING GOODS AND METHOD FOR CONVEYING GOODS

(71) Applicant: FAGOR ARRASATE, S.COOP., Arrasate-Mondragon (ES)

(72) Inventors: Carlos Alonso Ramila, San Sebastian (ES); Adolfo Lopez Sanchez, Errenteria (ES)

(73) Assignee: Fagor Arrasate, S. Coop., Arrasate-Mondragon (ES)

( * ) Notice: Subject to any disclaimer, the term of this patent is extended or adjusted under 35 U.S.C. 154(b) by 0 days. days.

(21) Appl. No.: 15/392,092

(22) Filed: Dec. 28, 2016

(65) Prior Publication Data
US 2017/0197792 A1 Jul. 13, 2017

(30) Foreign Application Priority Data
Jan. 7, 2016 (EP) .................................... 16382004

(51) Int. Cl.
*B65G 15/58* (2006.01)
*B65G 21/20* (2006.01)
*B65G 57/04* (2006.01)

(52) U.S. Cl.
CPC ..... *B65G 21/2018* (2013.01); *B65G 21/2036* (2013.01); *B65G 57/04* (2013.01)

(58) Field of Classification Search
CPC . B65G 15/58; B65G 21/2018; B65G 21/2036
USPC ......... 198/471.1, 472.1, 474.1, 689.1, 690.1, 198/691, 805, 811, 617; 271/197
See application file for complete search history.

(56) References Cited

U.S. PATENT DOCUMENTS

| | | | |
|---|---|---|---|
| 3,182,998 A * | 5/1965 | Peterson | B21D 43/18 198/689.1 |
| 3,554,131 A | 1/1971 | Radovic | |
| 6,422,377 B1 | 7/2002 | Ulrich | |
| 6,823,986 B2 * | 11/2004 | Vogel | B65G 21/2036 198/688.1 |
| 9,114,935 B2 * | 8/2015 | Kuge | H01L 21/67092 |

(Continued)

FOREIGN PATENT DOCUMENTS

| | | |
|---|---|---|
| CA | 2251771 A1 | 10/1997 |
| EP | 1081067 A1 | 3/2001 |

(Continued)

OTHER PUBLICATIONS

European Search Report in corresponding European Patent Application No. 16382004.6, dated Jun. 27, 2016.

*Primary Examiner* — Joseph Dillon, Jr.
(74) *Attorney, Agent, or Firm* — Edell, Shapiro & Finnan, LLC

(57) ABSTRACT

A conveyor for conveying good. According to one embodiment the conveyor includes a holding unit for holding or releasing the goods with respect to a conveyor belt. The holding unit includes vacuum holding means and magnetic holding means. The magnetic holding means includes at least one movable element that comprises at least one magnet or has a magnet attached thereto. The movable element is able to deactivate the magnetic holding means by distancing the magnet from the conveyor belt, and is also able to be arrange in a closed position in which the movable element blocks a vacuum conduit extending through the conveyor belt.

17 Claims, 3 Drawing Sheets

(56) References Cited

U.S. PATENT DOCUMENTS

| | | | |
|---|---|---|---|
| 9,604,796 B2* | 3/2017 | Witte | B65G 21/2018 |
| 2004/0248277 A1* | 12/2004 | Moya Garcia | B21D 43/22 |
| | | | 435/252.3 |
| 2009/0297316 A1 | 12/2009 | Wells et al. | |
| 2010/0095820 A1* | 4/2010 | Gutknecht | B29D 30/42 |
| | | | 83/409 |
| 2012/0295358 A1 | 11/2012 | Ariff et al. | |
| 2016/0244276 A1* | 8/2016 | Witte | B65G 21/2018 |

FOREIGN PATENT DOCUMENTS

| | | |
|---|---|---|
| EP | 1355838 B1 | 9/2004 |
| EP | 1541255 A1 | 6/2005 |
| EP | 2424796 B1 | 10/2014 |
| JP | H09290344 A | 11/1997 |
| WO | 2015057491 | 4/2015 |

\* cited by examiner

CONVEYING DEVICE FOR CONVEYING GOODS AND METHOD FOR CONVEYING GOODS

CROSS-REFERENCE TO RELATED APPLICATIONS

This application relates to and claims the benefit and priority to European Application No. EP16382004, filed Jan. 7, 2016, which is incorporated by reference herein in its entirety.

FIELD

The present invention relates to conveying devices and methods for conveying goods, particularly goods in the form of a sheet.

BACKGROUND

Conveying devices and methods for conveying goods, particularly goods in the form of a sheet, are known. Devices comprising conveyor means in the form of one or more rotating conveyor belts rotating around driven wheels, the goods in the form of a sheet being conveyed hanging from the lower side of the belts, are known. The goods are held or released with respect to the conveyor belt by means of magnetic holding means for conveying ferromagnetic goods, or by vacuum holding means for conveying ferromagnetic and/or non-ferromagnetic goods.

WO2010124767A1 discloses a conveying device for conveying goods, particularly goods in the form of a sheet, comprising conveyor means for conveying the goods and a holding unit for holding or releasing the goods with respect to the conveyor means, the holding unit comprising both vacuum holding means and magnetic holding means, the holding unit comprising a plurality of vacuum conduits that allows communicating the vacuum holding means with the conveyor means.

SUMMARY OF THE DISCLOSURE

According to one embodiment a conveying device for conveying goods, particularly goods in the form of a sheet, is provided comprising conveyor means for conveying the goods and a holding unit for holding or releasing the goods with respect to the conveyor means, the holding unit comprising vacuum holding means and magnetic holding means, the holding unit comprising at least one vacuum conduit that allows communicating the vacuum holding means with the conveyor means.

The magnetic holding means comprise at least one movable element comprising at least one magnet, being able to deactivate the magnetic holding means by distancing the movable element from the conveyor means, and being able to arrange the movable element in a closed position in which the movable element blocks the vacuum conduit.

Another aspect relates to methods for conveying goods, particularly goods in the form of a sheet, implemented with a conveying device for conveying goods such as that defined above.

The device allows, with a simple movement of a movable element, which in turn comprises a magnet, deactivating the magnetic holding means by distancing the movable element from the conveyor means, and therefore allows releasing the conveyed goods when the device works with the magnetic holding means, and furthermore allows arranging the movable element in a closed position in which the vacuum conduit is blocked, and thereby prevents holding of the goods by means of the vacuum holding means.

Therefore, a simple conveying device is obtained which allows, with few elements and a displacement of a movable element, operation of the device with magnetic holding means and vacuum holding means, the movable element performing a dual function: a first function associated with the activation/deactivation of the magnetic holding means, and a second function associated with the activation/deactivation of the vacuum holding means.

These and other advantages and features will become evident in view of the drawings and of the detailed description.

DETAILED DESCRIPTION

Figure 1:
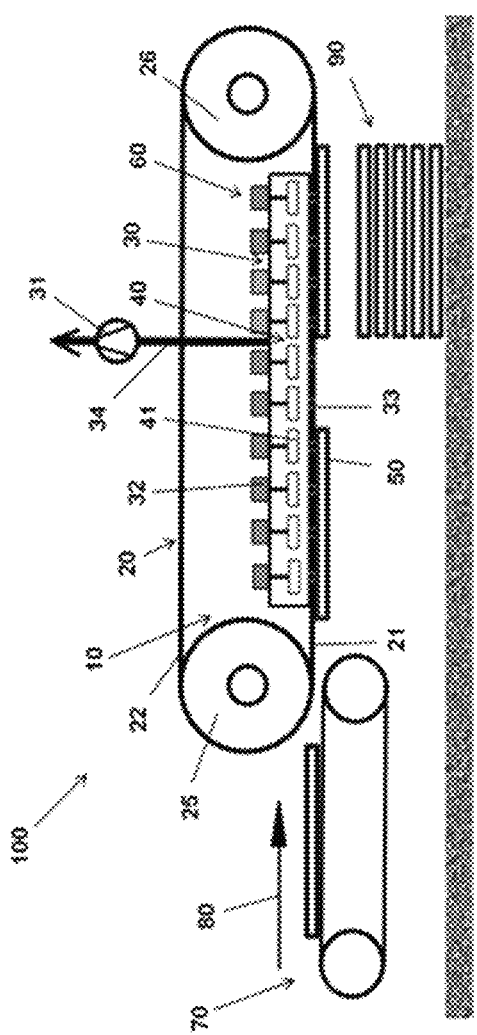
FIG. 1 shows a schematic view of a conveying device for conveying goods according to one embodiment.

FIG. 1 shows a schematic view of a conveying device 100 for conveying goods according to one embodiment. The conveying device 100 for conveying goods, particularly goods 50 in the form of a sheet, conveys ferromagnetic or non-ferromagnetic goods 50, such as for example sheets of aluminum or plastic, from a preceding manufacturing process or from a stacking area depicted by means of a discharge conveyor 70, to a stacking area 90 for stacking the goods 50, the conveying direction being depicted by means of the arrow 80.

The device 100 comprises conveyor means 20 for conveying the goods 50, the conveyor means 20 in this embodiment comprising an upper side 22 and a lower side 21 rotating around two mechanically- and/or electrically-driven wheels 25, 26. The lower side 21 of the conveyor means 20 is oriented at one end towards the discharge conveyor 70, and at the other end towards the stacking area 90 for stacking the goods 50. The goods 50 are held by and hang from the lower side 21, being released when the goods 50 reach the stacking area 90.

The device 100 also comprises a holding unit 10 for holding or releasing the goods 50 with respect to the conveyor means 20, specifically with respect to the lower side 21. The holding unit 10 comprises vacuum holding means 30 and magnetic holding means 40 configuring what is referred to as a hybrid conveying device for conveying goods. In this embodiment, the holding unit 10 comprises a plurality of vacuum conduits 33 that allows communicating the vacuum holding means 30 with the lower side 21 of the conveyor means 20, the vacuum conduits 33 being close to the conveyor means 20.

In this embodiment of the device 100, the magnetic holding means 40 comprise a plurality of movable elements 41, each of them comprising a magnet 42. Specifically, in this embodiment of the device 100, the movable element 41 is the magnet 42 itself, the magnet 42 therefore being the displaced element. In other embodiments of the device 100, not shown in the drawings, the magnet forms part of the movable element. According to one embodiment the device 100 comprises as many movable elements 41 as there are vacuum conduits 33, each movable element 41 being associated with a vacuum conduit 33. These movable elements 41 are operated by means of actuators 60, these actuators preferably being pneumatic or hydraulic piston and cylinder units, but they could also be rack and pinion units, cams or actuators of another type.

In this embodiment, the magnet 42 is a permanent magnet that does not require maintenance and does not require energy for activation or deactivation. This permanent magnet can be a basic magnet formed by ferrites, or it can be a neodymium magnet conferring greater attractive force with a lower weight.

The magnet 42 also can be an electromagnet (not depicted in the drawings). However, magnets of this type are more expensive due to both their structure and their maintenance, requiring external energy for activation and deactivation thereof, and thereby being able to hold or release the conveyed goods.

Figure 2:
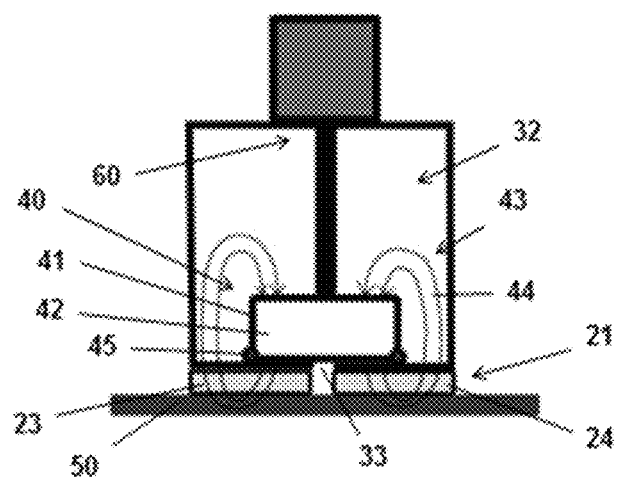
FIG. 2 shows a cross-section view of the embodiment of FIG. 1, the movable element of the magnetic holding means being in a closed position, and a ferromagnetic part being held with respect to the conveyor means by means of the magnetic holding means.
Figure 3:
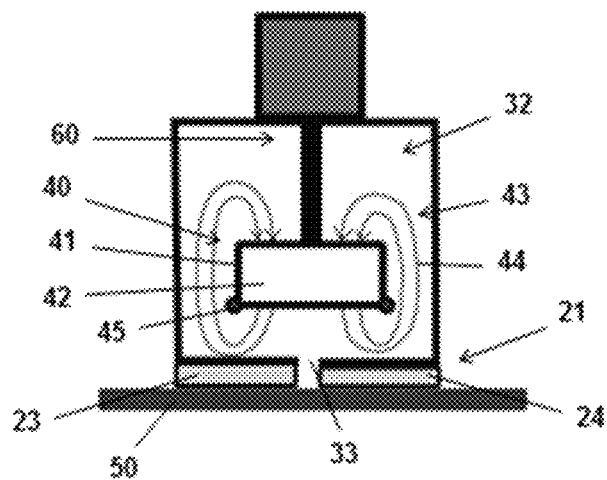
FIG. 3 shows a cross-section view of the embodiment of FIG. 1, the movable element of the magnetic holding means being distanced from the conveyor means, and a part being held with respect to the conveyor means by means of the activated vacuum holding means.
Figure 4:
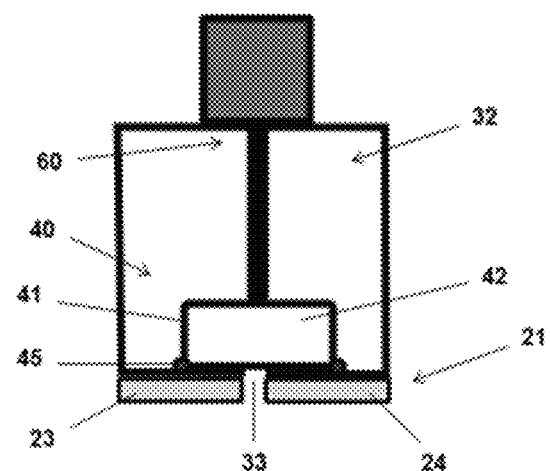
FIG. 4 shows a cross-section view of the embodiment of FIG. 1, the movable element of the magnetic holding means being in a closed position, and the part being released from the conveyor means, the magnetic field of the magnet of the movable element not being depicted.

FIGS. 2, 3 and 4 show cross-section views of the embodiment of the device 100 of FIG. 1.

The plurality of movable elements 41 are housed inside a vacuum chamber 32 comprising the vacuum holding means 30. The actuator elements 60 move the movable elements 41 inside the vacuum chamber 32 in a linear path that is perpendicular to the conveyor means 20. Other paths are also possible, displacing the movable element 41 in a circular path, or in a linear path but one that is not perpendicular to the conveyor means 20.

The vacuum chamber 32 may be an elongated chamber that is projected in the longitudinal direction of the device 100, the device 100 being able to comprise more than one vacuum chamber 32. In addition, in this embodiment the vacuum holding means 30 comprise a vacuum source 31, for example a suction or vacuum pump, which generates a vacuum in the vacuum chamber 32 through a vacuum duct 34. The vacuum conduits 33 are arranged in the vacuum chamber 32, in the lower part thereof, the side 21 of the conveyor means 20 being arranged adjacent to the lower part of the vacuum chamber 32 on the outer part thereof. Therefore, each vacuum conduit 32 allows the fluidic connection between the inside of the vacuum chamber 32 and the lower side 21 of the conveyor means 20.

In this embodiment of the device 100, the conveyor means 20 comprise two conveyor belts 23, 24 arranged parallel and adjacent to the lower part of the vacuum chamber 32. These conveyor belts 23, 24 provide an opening therebetween, in which the vacuum conduits 33 are arranged, such that the vacuum conduits 33 are arranged laterally adjacent to the conveyor belts 23, 24. Therefore, the conveyor belts 23, 24 allow the passage of air between the vacuum chamber 32 and the goods 50 arranged adjacent to the conveyor belts 23, 24 on the outer part thereof, through the vacuum conduits 33. In other embodiments of the device 100, not shown in the drawings, the conveyor means 20 comprise a single conveyor belt adjacent to the lower part of the vacuum chamber 32 and allow the passage of the air therethrough, for example due to their own structure, or due to the conveyor belt comprising a plurality of openings going through it and coinciding with the vacuum conduits 33.

The magnetic holding means 40 are activated and deactivated by means of the displacement of the movable elements 41. The magnetic holding means 40 are activated, as shown in FIG. 2, by the movable elements 41 moving and getting closer inside the vacuum chamber 32 to the conveyor belts 23, 24 of the conveyor means 20, the goods 50, which in this case are ferromagnetic goods, hanging and being held in the outer part of the conveyor belts 23, 24. The magnets 42 of the movable elements 41 each form a magnetic field 43 comprising field lines 44. As the movable element 41 gets closer to the goods 50, the field lines 44 in the goods 50 close, the goods 50 being held with respect to the conveyor belts 23, 24. In this activation position of the magnetic holding means 40, the movable elements 41 are arranged in a closed position, the movable elements 41 blocking each of the corresponding vacuum conduits 33. Therefore, in this embodiment of the device 100 it is the magnet 42 itself that blocks each of the vacuum conduits 33 in the closed position of the movable elements 41. To block the vacuum conduits 33, the movable elements 41, which in this embodiment of the device 100 coincide with the magnets 42, comprise a respective gasket 45, such that in the closed position of the movable elements 41 the magnets 42 are fitted to the vacuum conduits 33 in the inner part of the vacuum chamber 32, and with the help of the gaskets 45 they make the closure leak-tight.

To deactivate the magnetic holding means 40, the movable elements 41 move and, inside the vacuum chamber 32, are distanced from the conveyor belts 23, 24 of the conveyor means 20. Therefore, the field lines 44 do not close in the goods 50, such that the goods 50 are released from the conveyor belts 23, 24. The movable elements 41 must be sufficiently distanced from the goods 50 so that the field lines 44 of the magnetic fields 43 of each of the magnets 42 do not close in the goods 50. In this distancing position of the movable elements 41 with respect to the vacuum conduits 33, the movable elements 41 do not block the vacuum conduits 33, and therefore there is fluidic communication between the vacuum chamber 32 and the goods 50.

In one embodiment of the device 100, the device 100 comprises a vacuum source 31, which is a suction or vacuum pump, and also a fan. When the magnetic holding means 40 are deactivated by means of the displacement and distancing of the movable elements 41 with respect to the conveyor belts 23, 24, the vacuum source 31 optionally works as a fan and air is expelled through the vacuum conduits 33, which are now open, thereby helping to release the ferromagnetic goods 50 from the conveyor belts 23, 24.

The vacuum holding means 30 is activated, as shown in FIG. 3, by activating the vacuum source 31, such that a vacuum is generated in the vacuum chamber 32 through the vacuum duct 34. By displacing and distancing the movable elements 41, inside the vacuum chamber 32, from the conveyor belts 23, 24 of the conveyor means 20, the field lines 44 of the magnetic field 43 of each of the magnets 42 are not closed in the goods 50, which can be ferromagnetic or non-ferromagnetic. The movable elements 41 do not block the vacuum conduits 33, and therefore there is fluidic communication between the vacuum chamber 32 and the goods 50. The goods 50 are therefore held against the conveyor belts 23, 24 on the outer part thereof.

The vacuum holding means 30 is deactivated, as shown in FIG. 4, by the movable elements 41 displacing and getting closer to the conveyor belts 23, 24 of the conveyor means 20, taking the movable elements 41 to their closed position. The movable elements 41 thereby block the vacuum conduits 33, and therefore there is no fluidic communication between the vacuum chamber 32 and the goods 50, even though the vacuum source 31 is activated. Therefore, the goods 50 are released from the conveyor belts 23, 24.

The invention also relates to methods implemented by means of the device 100 of the invention. A first method comprises:
- a step of supplying the device 100 with ferromagnetic or non-ferromagnetic goods 50 from a previous stacking area or process,
- a step of holding by means of the vacuum holding means 30, wherein the movable elements 41 are not in the closed position, and therefore the vacuum holding means 30 hold the goods 50, and
- a step of releasing the goods 50, preferably into a stacking area 90, wherein the movable elements 41 are arranged in the closed position, and therefore the vacuum holding means 30 release the goods 50.

A second method that may be used when the conveying process is for conveying goods made of ferromagnetic material, comprises:
- a step of supplying the device 100 with ferromagnetic goods 50,
- a step of holding by means of the magnetic holding means 40, wherein the movable elements 41 are in the closed position, and the magnetic holding means 40 therefore hold the goods 50, and
- a step of releasing the ferromagnetic goods 50, preferably into a stacking area 90, wherein the movable elements 41 are distanced from the conveyor means 20, and the magnetic holding means 40 therefore release the goods 50.

In an embodiment of this second method, in this step of releasing the ferromagnetic goods 50, the vacuum holding means 30 expel air through the vacuum conduits 33, contributing to the release of the goods 50.

What is claimed is:

1. A conveying device for conveying a good from a first location to a second location, the conveying device comprising:
   a belt configured to transport the good, the belt having a first side, a second side, and a conduit extending between and through the first and second sides, the first side of the belt being configured to hold the good,
   a holding unit that functions to hold the good to the belt and to release the good from the belt, the holding unit being located on the second side of the belt and including a vacuum holding apparatus and a magnetic holding apparatus, the vacuum holding apparatus including a vacuum chamber that is in fluid communication with a vacuum source and the conduit located in the belt, the magnetic holding apparatus having a movable element comprising a magnet, the movable element movable between an activate position and a deactivate position, the activate position being located nearer the second side of the belt than the deactivate position, when the movable element is in the activate position the magnet is capable of holding the good to the first side of the belt, when the movable element is in the deactivate position the magnet is incapable of holding the good to the first side of the belt, the movable element being configured and movable to cut off fluid communication between the vacuum chamber and the conduit.

2. The conveying device according to claim 1, wherein the magnet is a permanent magnet.

3. The conveying device according to claim 1, wherein the magnet is an electromagnet.

4. The conveying device according to claim 1, wherein the magnet itself cuts off fluid communication between the vacuum chamber and the conduit.

5. The conveying device according to claim 1, wherein the movable element comprises a gasket so that cut off of fluid communication between the vacuum chamber and the conduit occurs in a leak-tight manner.

6. The conveying device according to claim 1, wherein when the movable element is positioned to cut off fluid communication between the vacuum chamber and the conduit the movable element is in the activate position.

7. The conveying device according to claim 1, wherein the belt is configured to move the good in a first direction, the movable element configured to move along a linear path that is substantially perpendicular to the first direction.

8. The conveying device according to claim 7, wherein the movable element is moved by use of a rack and pinion unit actuator.

9. The conveying device according to claim 7, wherein the movable element is moved by use of a piston and cylinder unit actuator.

10. The conveying device according to claim 7, wherein the movable element is moved by use of a cam.

11. The conveying device according to claim 1, wherein the belt includes a plurality of conduits and the holding unit comprises a plurality of respective movable elements housed in the vacuum chamber, the plurality of movable elements being configured and movable to cut off fluid communication between the vacuum chamber and the respective conduits.

12. The conveying device according to claim 1, wherein the vacuum chamber comprises a housing onto which the belt is affixed, the housing having a through hole that connects the vacuum chamber to the conduit in the belt.

13. The conveying device according to claim 12, wherein the movable element is movable to press against the vacuum chamber housing at the location of the through hole to cut off fluid communication between the vacuum chamber and the conduit in the belt.

14. The conveying device according to claim 1, wherein the vacuum chamber is connected to a forced air source that enables the holding unit to push air through the conduit of the belt to facilitate a release of the good from the belt.

15. A method of conveying a good from a first location to a second location by use of a belt of a conveying device, the belt having a first side, a second side and a conduit extending between and through the first and second sides, the first side of the belt being configured to hold the good through the use of a holding unit positioned on the second side of the belt, the holding unit including a vacuum holding apparatus and a magnetic holding apparatus, the vacuum holding apparatus comprising a vacuum chamber in fluid communication with the belt conduit, the magnetic holding apparatus including a movable element comprising a magnet, the movable element movable between a first position and a second position, when in the second position the movable element terminates fluid communication between the vacuum chamber and the belt conduit, the method comprising:
   at the first location, with the movable element located in the first position, holding the good to the first side of the belt by creating a vacuum inside the belt conduit by use of the vacuum holding apparatus, transporting the good from the first location to the second location: and at the second location releasing the good from the first side of the belt by moving the movable element to the second position.

16. The method according to claim 15, further comprising pushing air through the conduit to assist in the releasing of the good from the first side of the belt.

17. The method according to claim 15, wherein termination of fluid communication between the vacuum chamber and the belt conduit is achieved by use of the magnet itself.

* * * * *